United States Patent [19]

Ogawa

[11] Patent Number: 4,905,747

[45] Date of Patent: Mar. 6, 1990

[54] PNEUMATIC RADIAL TIRE SHOULDER STRUCTURE

[75] Inventor: Yukihiro Ogawa, Hiratsuka, Japan

[73] Assignee: The Yokohama Rubber Co. Ltd., Tokyo, Japan

[21] Appl. No.: 133,468

[22] Filed: Dec. 15, 1987

[30] Foreign Application Priority Data

Jan. 27, 1987 [JP] Japan .................................. 62-15234

[51] Int. Cl.$^4$ ............................................ B60C 11/01
[52] U.S. Cl. ................................ 152/209 R; 152/523; 152/538
[58] Field of Search .......... 152/209 R, 209 D, 209 A, 152/209 B, 538, 526, 523

[56] References Cited

U.S. PATENT DOCUMENTS

| | | | |
|---|---|---|---|
| 2,908,312 | 10/1959 | Olsen | 152/209 R |
| 3,831,654 | 8/1974 | Boileau | 152/209 R |
| 3,949,797 | 4/1976 | Mirtain et al. | 152/209 R |
| 3,982,579 | 9/1976 | Mirtain | 152/209 R |
| 3,985,173 | 10/1976 | Masson | 152/538 X |
| 4,471,825 | 9/1984 | Kuhn et al. | 152/209 R |
| 4,739,812 | 4/1988 | Ogawa et al. | 152/209 R |

Primary Examiner—Michael W. Ball
Assistant Examiner—Geoffrey L. Knable
Attorney, Agent, or Firm—Armstrong, Nikaido Marmelstein Kubovcik & Murray

[57] ABSTRACT

A pneumatic radial tire having a carcass ply and a belt layer, wherein the tire has a shoulder portion formed stepwise in its meridian cross-section and an outer end portion in the widthwise direction of each step is notched in a circular zigzag shape in the circumferential direction of the tire.

1 Claim, 4 Drawing Sheets

PNEUMATIC RADIAL TIRE SHOULDER STRUCTURE

BACKGROUND OF THE INVENTION

This invention relates to a pneumatic radial tire free from the occurrence of a step wear which tends to occur at the end portions of the shoulders of a tire.

Examples of the measures for preventing the step wear which have been taken in the past include the provision of subgrooves on the shoulder ribs and the provision of a number of cuts or kerfs on the shoulder edges. The provision of subgrooves on the shoulder ribs of a tire is effective for prevention of the occurrence of step wear. However, this expedient causes a remarkable lowering in the rigidity of the shoulder ribs, which in turn leads to a lowering in the cornering power and driving stability. On the other hand, the provision of a number of cuts or kerfs on the shoulder edges brings about not only the occurrence of cracking or cupping at the end of the cuts or the end of the kerfs but also a lowering in the driving stability due to the lowering in the rigidity of the shoulder ribs. Further, this expedient has an additional problem of an increase in the mold cost etc.

SUMMARY OF THE INVENTION

An object of the present invention is to provide a pneumatic radial tire which enables the prevention of step wear without causing the above-mentioned problems accompanying the prior art.

In accordance with the present invention, there is provided a pneumatic radial tire at least having two belt layers capable of functioning as a pair of tension members between a carcass ply and a tread, wherein said tire has a shoulder portion formed stepwise in its meridian cross-section and an outer end portion in the widthwise direction of each of said steps is notched in a circular zigzag shape in the circumferential direction of the tire.

The above object and other objects and features of the present invention will become more apparent from the following description in conjunction with the accompanying drawings.

DESCRIPTION OF THE PREFERRED EMBODIMENTS

In the pneumatic radial tire of the present invention, a carcass ply is disposed between a pair of bead portions, i.e., left and right bead portions (not shown). The carcass ply comprises metallic cords or organic fiber cords and will suffice when at least one layer of the cords is provided. The cords make an angle of about 90° with the circumferential direction of the tire. Further, two belt layers capable of functioning as a pair of tension members are at least disposed between the carcass ply and the tread (i.e., lower belt layer $4_1$ and upper belt layer $4_2$ in FIG. 2). The belt layer comprises metallic cords, and the cords cross each other between the plies.

Figure 1:
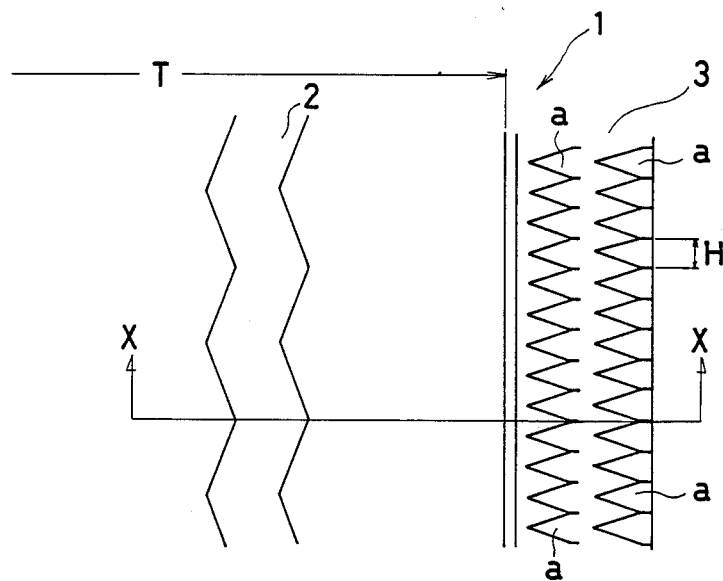
FIG. 1 is a plan view of the principal part of a tread surface (ground-contacting portion of the tire) of a radial tire according to the present invention.
Figure 2:
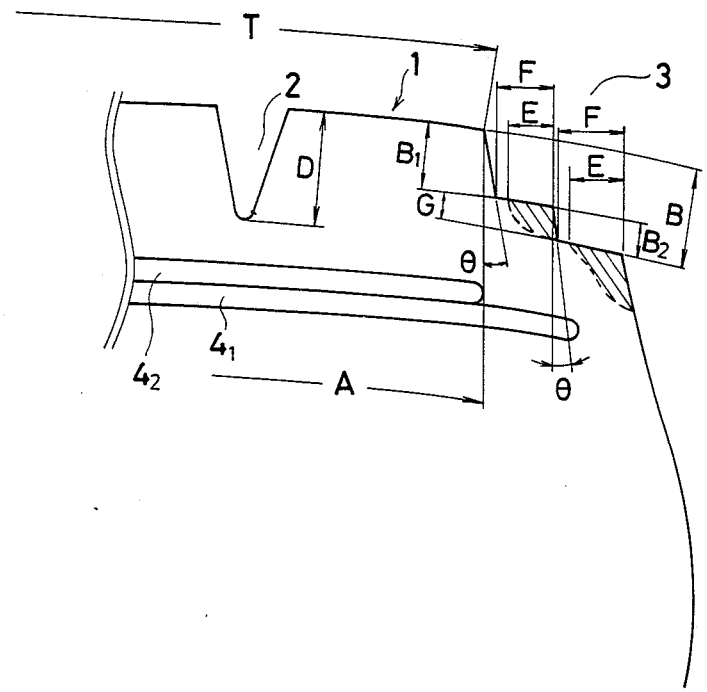
FIG. 2 is a meridian cross-sectional view taken along line X—X of FIG. 2.

In FIGS. 1 and 2, a main groove 2 is circularly provided on a tread surface 1 in the circumferential direction of the tire. As shown in FIG. 2, a shoulder portion 3 is formed stepwise in the meridian cross-section thereof outside the axial end of the ground-contacting portion of the tread. In this case, it will suffice when at least one step (two steps in the case of an example as shown in FIG. 2) is formed.

As shown in FIG. 1, the outer end portion in the widthwise direction of each step is circularly notched in a zigzag form. This form of the outer end portion of each step is provided by a plurality of notched recessed portions a arranged in a circular pattern around the circumferential direction of the tire with the apex of each notched angular recess pointing toward the tire tread and the sides of each recess intersecting a side of an adjacent recess.

Reference letter T designates the width of development of the tread, letter A the width of the belt layer capable of functioning as a tension member (hereinafter referred to as the "effective belt width"), letter $B_1$ the height of the side of the first step, letter D the depth of the main groove 2, letter E the length of the zigzag in each step in the cross-sectional direction (widthwise direction) of the tire, letter F the length of the step surface in the cross sectional direction of the tire, letter G the height of the zigzag, letter H the length of the pitch of the zigzag or the width of each recess in the circumferential direction of the tire, letter $\theta$ the slope of the side of the step, and letter B the overall height of the step (the depth of the final step surface).

The "height" dimensions represented by letters B, $B_1$, $B_2$ and G are measured relative to the radius of curvature of the tread surface 1, and the lines B, $B_1$, $B_2$ and G respectively represent the length or distance measured normal to the radius of curvature of the tread surface 1 or an extension of the tread surface 1.

Thus, in the present invention, the stepwise formation of the shoulder portion of the radial tire in the meridian cross-section thereof and the circular notching of the outer end portion in the widthwise direction of each step in a zigzag form in the circumferential direction of the tire contribute to the prevention of the lowering in the rigidity of the shoulder portion, as opposed to the prior art in which subgrooves are provided on the shoulder ribs and a number of kerfs are arranged on the shoulder edges.

(1) It is preferred that a new tire before travelling have an effective belt width, A, of 0.95 to 1.05 times larger than the width of the development of the tread, T, (i.e., $0.95 \leq (A/T) \leq 1.05$).

This is because a uniform ground-contact pressure distribution is required on the whole surface of the tread. The step wear of the tread portion can be prevented without causing any lowering in the driving stability by meeting the above-mentioned requirement.

Figure 3:
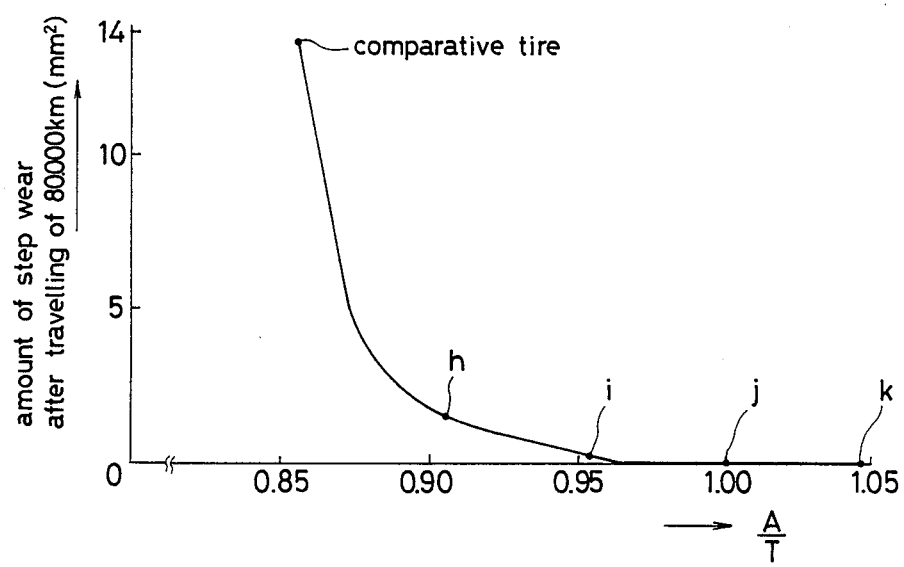
FIG. 3 is a graph showing the relationship between the ratio of an effective width of the belt, A, to the width of the development of the tread, T, (i.e., A/T) and the amount of the step wear.

The above-mentioned range was determined through a travel test by making use of five kinds of tires as shown in Table 1.

after travelling of 80,000 km was determined based on the results as shown in Table 1 and is graphically shown in FIG. 3. The amount of the step wear was obtained by multiplying the average length of the step wear by the average depth of the step wear. In FIG. 3, reference letter h designates a value for the test tire 1, letter i a value for the test tire 2, letter j a value for the test tire 3, and letter k a value for the test tire 4.

As can be seen from Table 1 and FIG. 3, the higher the ratio (A/T), the greater the decrease in the amount of the step wear. The amounts of the step wear of the test tires 2 to 4 are on a level raising no problem. Therefore, the lower limit of the ratio (A/T) is set at 0.95.

When the ratio (A/T) is 0.95 or more, the step wear

TABLE 1

|  |  |  | compara- tive tire | test tire 1 h | test tire 2 i | test tire 3 j | test tire 4 k |
|---|---|---|---|---|---|---|---|
|  | width of development of the tread (T) (mm) |  | 190 | 190 | 190 | 190 | 190 |
|  | effective belt width (A) (mm) |  | 163 | 172 | 181 | 190 | 199 |
|  | depth of main grooves (D) (mm) |  | 13.7 | 13.7 | 13.7 | 13.7 | 13.7 |
|  | residual depth of grooves(mm) |  | 9.3 | 9.0 | 9.6 | 9.7 | 9.5 |
| travelled distance: 35,000 km | length of step wear in the end portion of the tread | Ave (mm) | 4.3 | 2.2 | 1.0 | 0.0 | 0.0 |
|  |  | max (mm) | 6.2 | 3.8 | 1.3 | 0.0 | 0.0 |
|  |  | min (mm) | 2.1 | 1.6 | 0.4 | 0.0 | 0.0 |
|  | depth of step wear in the end portion of the tread | Ave (mm) | 1.8 | 0.8 | 0.4 | 0.0 | 0.0 |
|  |  | max (mm) | 2.4 | 1.1 | 0.6 | 0.0 | 0.0 |
|  |  | min (mm) | 1.1 | 0.5 | 0.2 | 0.0 | 0.0 |
|  | residual depth of grooves(mm) |  | 4.4 | 4.5 | 4.7 | 4.9 | 4.8 |
| travelled distance: 80,000 km | length of step wear in the end portion of the tread | Ave (mm) | 6.3 | 2.4 | 0.8 | 0.0 | 0.0 |
|  |  | max (mm) | 8.1 | 3.5 | 1.5 | 0.0 | 0.0 |
|  |  | min (mm) | 2.3 | 1.8 | 0.3 | 0.0 | 0.0 |
|  | depth of step wear in the end portion of the tread | Ave (mm) | 2.2 | 0.6 | 0.3 | 0.0 | 0.0 |
|  |  | max (mm) | 2.6 | 0.9 | 0.5 | 0.0 | 0.0 |
|  |  | min (mm) | 1.8 | 0.5 | 0.2 | 0.0 | 0.0 |

Note:
Size of the tire: 10.00R20 14PR rib type.
Travel road: paved road 98%.
Position of tire: front wheels (without interchange).
Average speed: 55 km/hr.
Load: normal load as prescribed in JIS.
Determination of step wear: the tire was divided into 16 equal parts, and the maximum and minimum values of wear per division were determined.
Length and depth of the step wear in the end portion of the tread: Ave; average, max; maximum, and min; minimum.

Note: Size of the tire: 10.00R20 14PR rib type.
Travel road: paved road 98%.
Position of tire: front wheels (without interchange).
Average speed: 55 km/hr.
Load: normal load as prescribed in JIS.
Determination of step wear: the tire was divided into 16 equal parts, and the maximum and minimum values of wear per division were determined.

Length and depth of the step wear in the end portion of the tread: Ave; average, max; maximum, and min; minimum.

The relationship between the ratio of an effective width of the belt, A, to the width of the development of the tread, T, (i.e., A/T) and the amount of the step wear can be suppressed. However, when the ratio exceeds 1.05, the rubber thickness in the side portion in the cross-sectional direction of the belt layer is insufficient, which leads to a lowering in the durability of the belt portion. For this reason, the upper limit of the ratio (A/T) was set at 1.05. Therefore, the ratio (A/T) is $0.95 \leq (A/T) \leq 1.05$.

(2) It is preferred that the side of the first step has a height, $B_1$, corresponding to 35 to 65% of the depth, D, of the main grooves 2 (i.e., $B_1 = 0.35D$ to $0.65D$).

The results of travel tests on four kinds of tires which are different from each other in the height, $B_1$, of the side of the first step (hereinafter referred to as the "height of the first step") are shown in Table 2.

TABLE 2

|  | test tire 5 l | test tire 6 m | test tire 7 n | test tire 8 r |
|---|---|---|---|---|
| width of development of the tread (T) (mm) | 190 | 190 | 190 | 190 |
| effective belt width (A) (mm) | 181 | 181 | 181 | 181 |
| depth of main grooves (D) (mm) | 13.7 | 13.7 | 13.7 | 13.7 |

TABLE 2-continued

|  |  |  | test tire 5 l | test tire 6 m | test tire 7 n | test tire 8 r |
|---|---|---|---|---|---|---|
|  | height of the first step ($B_1$) (mm) |  | 2.5 | 5.0 | 7.5 | 10.0 |
|  | width of step surface (F) (mm) |  | 10.0 | 10.0 | 10.0 | 10.0 |
|  | residual depth of grooves (mm) |  | 12.0 | 11.9 | 12.1 | 12.4 |
| travelled distance: 15,000 km | length of step wear in the end portion of the tread | Ave (mm) | 2.1 | 0.0 | 0.0 | 0.0 |
|  |  | max (mm) | 3.3 | 0.0 | 0.0 | 0.0 |
|  |  | min (mm) | 0.6 | 0.0 | 0.0 | 0.0 |
|  | depth of step wear in the end portion of the tread | Ave (mm) | 0.8 | 0.0 | 0.0 | 0.0 |
|  |  | max (mm) | 1.1 | 0.0 | 0.0 | 0.0 |
|  |  | min (mm) | 0.6 | 0.0 | 0.0 | 0.0 |
|  | residual depth of grooves (mm) |  | 9.1 | 9.3 | 9.0 | 8.9 |
| travelled distance: 35,000 km | length of step wear in the end portion of the tread | Ave (mm) | 2.6 | 0.9 | 0.0 | 0.0 |
|  |  | max (mm) | 3.1 | 1.2 | 0.0 | 0.0 |
|  |  | min (mm) | 0.9 | 0.5 | 0.0 | 0.0 |
|  | depth of step wear in the end portion of the tread | Ave (mm) | 1.3 | 0.3 | 0.0 | 0.0 |
|  |  | max (mm) | 1.6 | 0.5 | 0.0 | 0.0 |
|  |  | min (mm) | 0.8 | 0.2 | 0.0 | 0.0 |
|  | residual depth of grooves (mm) |  | 4.8 | 4.6 | 4.3 | 3.9 |
| travelled distance: 80,000 km | length of step wear in the end portion of the tread | Ave (mm) | 5.8 | 1.7 | 1.3 | 0.0 |
|  |  | max (mm) | 7.6 | 2.3 | 1.8 | 0.0 |
|  |  | min (mm) | 3.6 | 1.1 | 0.7 | 0.0 |
|  | depth of step wear in the end portion of the tread | Ave (mm) | 2.7 | 0.6 | 0.3 | 0.0 |
|  |  | max (mm) | 3.1 | 1.0 | 0.6 | 0.0 |
|  |  | min (mm) | 1.6 | 0.4 | 0.2 | 0.0 |

Note: Size of the tire and other test conditions are the same as those shown in Table 1.

As can be seen from the test results as shown in Table 2, the test tire 5 causes the step wear in an early stage (travelled distance: 15,000 km). The step wear grows with an increase in the travelled distance. The cause of the occurrence of the step wear in an early stage of the test tire 5 is believed to reside in that a continuous change in the rigidity of the ground-contacting area of the tread from the central portion of the tread to the end portion of the shoulder cannot be attained due to the rubber content of the end portion of the shoulder higher than those of the other test tires, which makes the test tire 5 substantially similar to the conventional tires.

Figure 4:
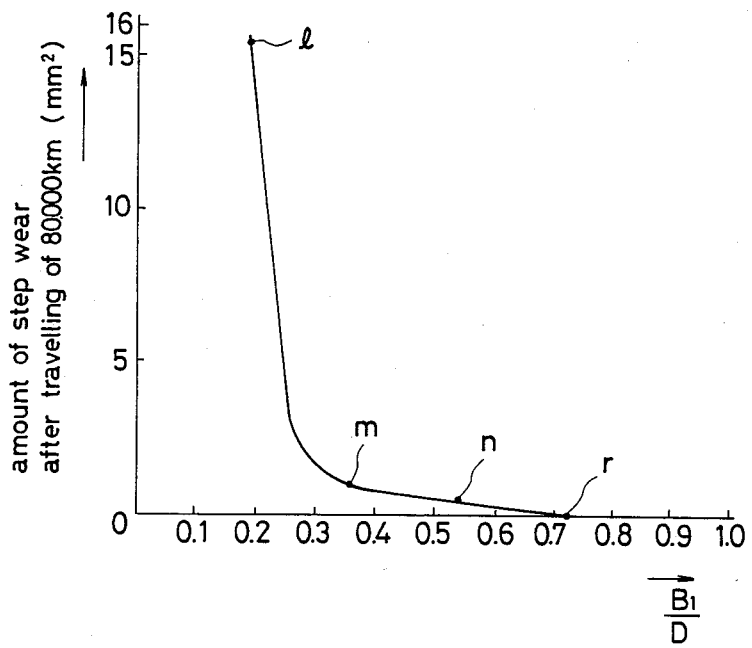
FIG. 4 is a graph showing the relationship between the ratio of the height of the first step, $B_1$, to the depth of the main groove, D, (i.e., $B_1/D$) and the amount of the step wear.

The test results as shown in Table 2 are graphically shown in FIG. 4. Specifically, FIG. 4 is a graph showing the relationship between the ratio of the height, $B_1$, of the first step to the depth, D, of the main groove (i.e., $B_1/D$) and the amount of the step wear after travelling of 80,000 km. The amount of the step wear was obtained by multiplying the average length of the step wear by the average depth of the step wear. In FIG. 4, reference letter l designates a value for the test tire 5, letter m a value for the test tire 6, letter n a value for the test tire 7, and letter r a value for the test tire 8.

As can be seen from FIG. 4, the test tires 6 to 8 exhibited a step wear of a level raising no problem. For this reason, the lower limit of the ratio ($B_1/D$) was set at 0.35 [$0.35 \leq (B_1/D)$].

Figure 5:
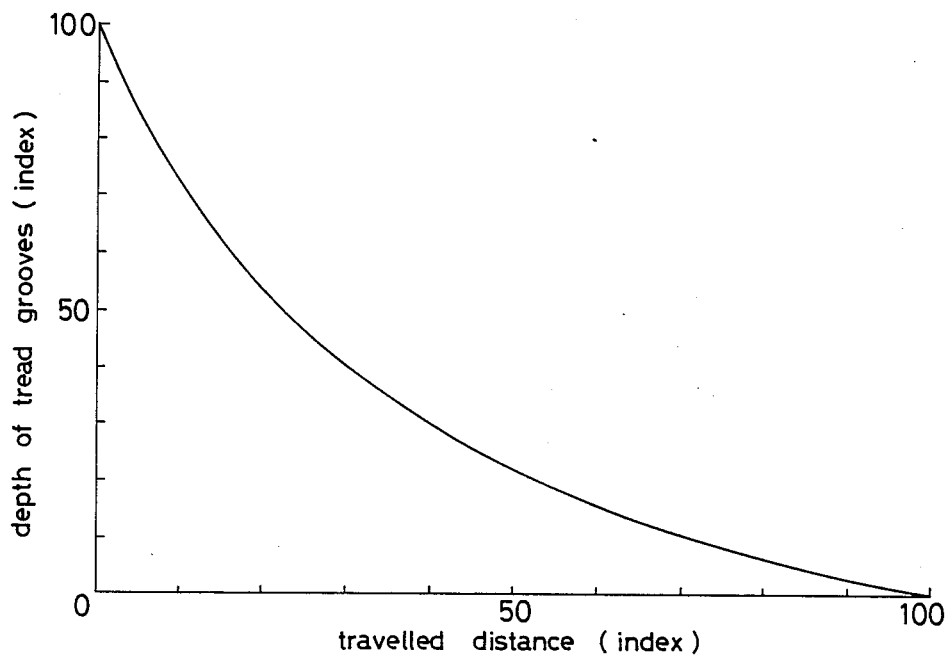
FIG. 5 is a graph showing the relationship between the depth of the tread groove and the travel distance.

With respect to the upper limit of the ratio ($B_1/D$), a continuous change in the rigidity of the ground-contacting area can be attained when the ratio ($B_1/D$) is 0.35 or higher, which contributes to the prevention of the step wear. However, the greater the height, $B_1$, of the first step, the smaller the width, T, of the development of the tread, which leads to a lowering in the wear resistance. Therefore, it is necessary to maintain and improve the wear resistance of the whole tire through the determination of the upper limit of the ratio ($B_1/D$), i.e., the increase of the width, T, of the development of the tread at a certain position. A general relationship between the depth of the tread grooves and the wear resistance (travelled distance) is shown in FIG. 5. As can be seen from FIG. 5, the wear resistance per unit depth of the grooves is rapidly increased after the tread is worn by 55 to 65%. However, as can be seen from Table 2, the mere rapid increase in the wear resistance per unit depth of the groove does not lead to the maintenance and the improvement with respect to the wear resistance of the whole tire. On the other hand, the action on the maintenance and improvement with respect to the whole tire can be doubled by increasing the width, T, of the development of the tread at a point where the tread is worn by 65%, i.e., by setting the upper limit of the ratio ($B_1/D$) at 0.65. For this reason, the upper limit of the ratio ($B_1/D$) was set at 0.65 [$(B_1/D) \leq 0.65$].

Since the height, $B_1$, of the first step greatly contributes to the suppression of the step wear, improvement in fuel consumption, and maintenance and improvement with respect to the wear resistance, the heights of the second and subsequent steps may be lower than the height, $B_1$, of the first step.

(3) It is preferred that in a new tire before travelling, the length, F, of the step surface in the cross-sectional direction of the tire (widthwise direction of the tire) is 0.03 to 0.06 time the width, T, of the development of the tread (i.e., $0.03 \leq (F/T) \leq 0.06$).

The step surface in the cross-sectional direction of the tire (hereinafter referred to as the "step surface width") should have a length sufficient to increase the width, T, of the development of the tread from a particular position of the tread for the purpose of improving the wear resistance of the tread surface and, at the same time, to dispose a zigzag on the step surface for the purpose of preventing the step wear.

The comparison of the residual grooves after travelling of 80,000 km between test tires 9 to 13 and comparative tire based on the test data as shown in Table 3 substantiates the improvement in the wear resistance of the tread surface. However, when the width, F, of the step surface is too large (i.e., $F/T > 0.06$), the balance of the rigidity of the ribs of the whole tread is broken at the wear region in the second or subsequent step, which brings about a center wear. On the other hand, when the width, F, of the step surface is too small (i.e., F/T<0.03), the length of the zigzag provided in the cross-sectional direction of the tire for the purpose of preventing the step wear cannot be sufficiently attained.

For the above-mentioned reasons, the ratio (F/T) was set at $0.03 \leq (F/T) \leq 0.06$.

v a value for the test tire 12, and letter w a value for the test tire 13.

Figure 6:
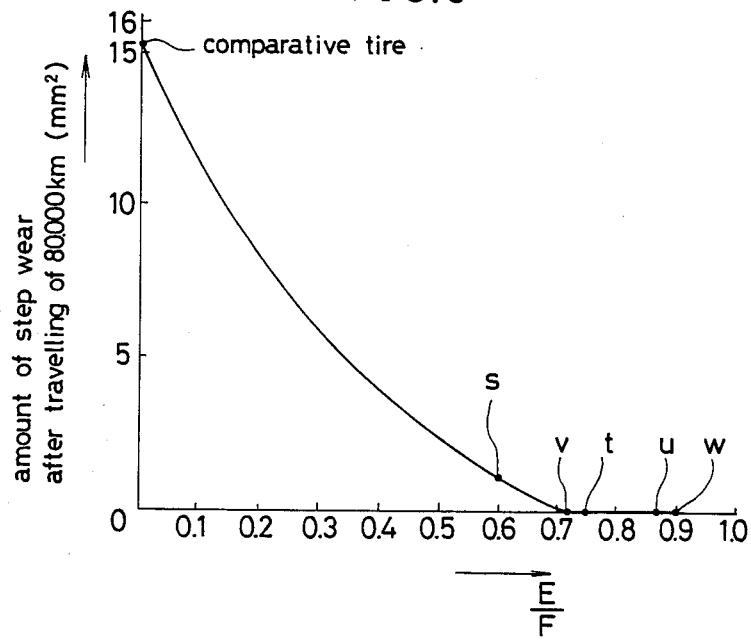
FIG. 6 is a graph showing the relationship between the ratio of the length of a zigzag in the widthwise direction of the tire, E, to the width of the step surface, F, (i.e., E/F) and the amount of the step wear.

As can be seen from Table 3 and FIG. 6, test tires 10 to 13 exhibit an effect superior to that of the test tire 9 and comparative tire. Although a step wear is observed in test tire 9, its extent is small and is on a level raising no problem. Therefore, the lower limit of the ratio (E/F) was set at 0.6, which was obtained with respect

TABLE 3

|  |  |  | test tire 9 s | test tire 10 t | test tire 11 u | test tire 12 v | test tire 13 w | comparative tire (conventional tire) |
|---|---|---|---|---|---|---|---|---|
|  | width of development of the tread (T) (mm) |  | 190 | 190 | 190 | 190 | 190 | 190 |
|  | effective belt width (A) (mm) |  | 181 | 181 | 181 | 181 | 181 | 163 |
|  | depth of main grooves (D) (mm) |  | 13.7 | 13.7 | 13.7 | 13.7 | 13.7 | 13.7 |
|  | height of the first step ($B_1$) (mm) |  | 7.5 | 7.5 | 7.5 | 7.5 | 7.5 | — |
|  | width of step surface (F) (mm) |  | 5.0 | 8.0 | 11.0 | 11.0 | — |  |
|  | length of zigzag (E) (mm) |  | 3.0 | 6.0 | 7.0 | 8.0 | 10.0 | — |
|  | length of pitch of zigzag (H) (mm) |  | 3.0 | 1.0 | 1.0 | 0.5 | 0.5 | — |
|  | height of zigzag (G) (mm) |  | same as the height of step | same as the height of step | same as the height of step | same as the height of step | same as the height of step | — |
|  | angle of step wall (θ) (mm) |  | 15° | 15° | 15° | 15° | 15° | — |
|  | height of final step (B) (mm) |  | 8.5 | 10.0 | 10.0 | 12.0 | 12.0 | — |
|  | residual depth of grooves(mm) |  | 9.0 | 9.3 | 9.3 | 9.7 | 9.8 | 9.2 |
|  | length of step wear | Ave (mm) | 0.8 | 0.0 | 0.0 | 0.0 | 0.0 | 4.8 |
| travelled distance: 35,000 km | in the end portion of the tread | max (mm) | 1.1 | 0.0 | 0.0 | 0.0 | 0.0 | 5.8 |
|  |  | min (mm) | 0.4 | 0.0 | 0.0 | 0.0 | 0.0 | 2.6 |
|  | depth of step wear in the end portion of the tread | Ave (mm) | 0.3 | 0.0 | 0.0 | 0.0 | 0.0 | 1.6 |
|  |  | max (mm) | 0.5 | 0.0 | 0.0 | 0.0 | 0.0 | 2.3 |
|  |  | min (mm) | 0.2 | 0.0 | 0.0 | 0.0 | 0.0 | 1.1 |
|  | residual depth of grooves(mm) |  | 5.6 | 5.5 | 5.4 | 5.6 | 5.4 | 4.6 |
|  | length of step wear in the end portion of the tread | Ave (mm) | 0.4 | 0.0 | 0.0 | 0.0 | 0.0 | 6.6 |
|  |  | max (mm) | 0.5 | 0.0 | 0.0 | 0.0 | 0.0 | 8.3 |
|  |  | min (mm) | 0.2 | 0.0 | 0.0 | 0.0 | 0.0 | 3.2 |
| travelled distance: 80,000 km | depth of step wear in the end portion of the tread | Ave (mm) | 0.3 | 0.0 | 0.0 | 0.0 | 0.0 | 2.3 |
|  |  | max (mm) | 0.4 | 0.0 | 0.0 | 0.0 | 0.0 | 2.6 |
|  |  | min (mm) | 0.1 | 0.0 | 0.0 | 0.0 | 0.0 | 1.6 |
|  | number of cracks caused at the root portion of the zigzag |  | 0 | 0 | 6 | 0 | 13 | — |
|  | state of cupping in the zigzag* |  | 100 | 100 | 100 | 83 | 73 | — |

Note:
Tire size and other test conditions are the same as those shown in Table 1.
*The state of the cupping is expressed in terms of an index. The lower the index, the worse the state of the cupping.

(4) It is preferred that the length, E, of the zigzag in the widthwise direction of the tire disposed in the end portion of the step surface in each step be 0.6 to 0.8 time the width, F, of the step surface (i.e., $0.6 \leq (E/F) \leq 0.8$).

Figure 7:
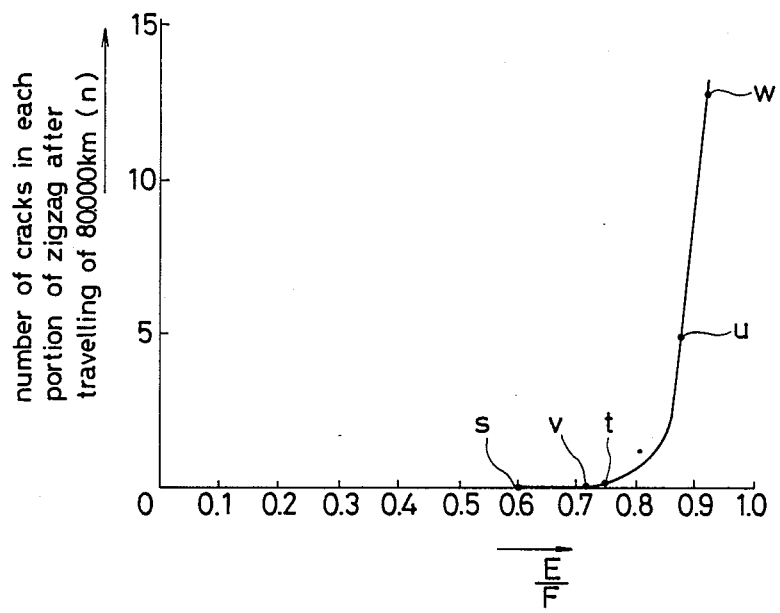
FIG. 7 is a graph showing the relationship between the ratio of the length of a zigzag in the widthwise direction of the tire, E, to the width of the step surface, F, (i.e., E/F) and the number of the cracks caused in each portion of the zigzag.

The step wear can be prevented by disposing a zigzag pattern in the step portion. The results of tests on the prevention of the step wear are shown in Table 3 and FIG. 6. Specifically, FIG. 6 is a graph showing the relationship between the ratio of the length, E, of the zigzag in the widthwise direction of the tire to the width, F, of the step surface (i.e., E/F) and the amount of the step wear after travelling of 80,000 km. The amount of the step wear was calculated by multiplying the average length of the step wear by the average depth of the step wear. In FIG. 6, reference letter s designates a value for the test tire 9, letter t a value for the test tire 10, letter u a value for the test tire 11, letter to the test tire 9. On the other hand, the upper limit of the ratio (E/F) was set at 0.8, at which the number of the cracks was short of 1, according to the data as shown in FIG. 7. FIG. 7 is a graph showing the relationship between the ratio of the length, E, of the zigzag in the widthwise direction of the tire to the width, F, of the step surface (i.e., E/F) and the number (n) of the cracks in each portion of the zigzag after travelling of 80,000 km.

(5) It is preferred that the length, H, of the zigzag in the widthwise direction of the tire disposed in the end portion of the step surface in each step be 0.1 to 1.0 time the length, E, of the zigzag in the widthwise direction of the tire (i.e., $0.10 \leq (H/E) \leq 1.0$).

The length, H, of the pitch of the zigzag is an important factor for lowering the rigidity of the step portion in the circumferential direction of the tire to a suitable level. However, an excessive lowering in the rigidity in the circumferential direction of the tire unfavorably induces the occurrence of the cupping in the zigzag portion.

Figure 8:
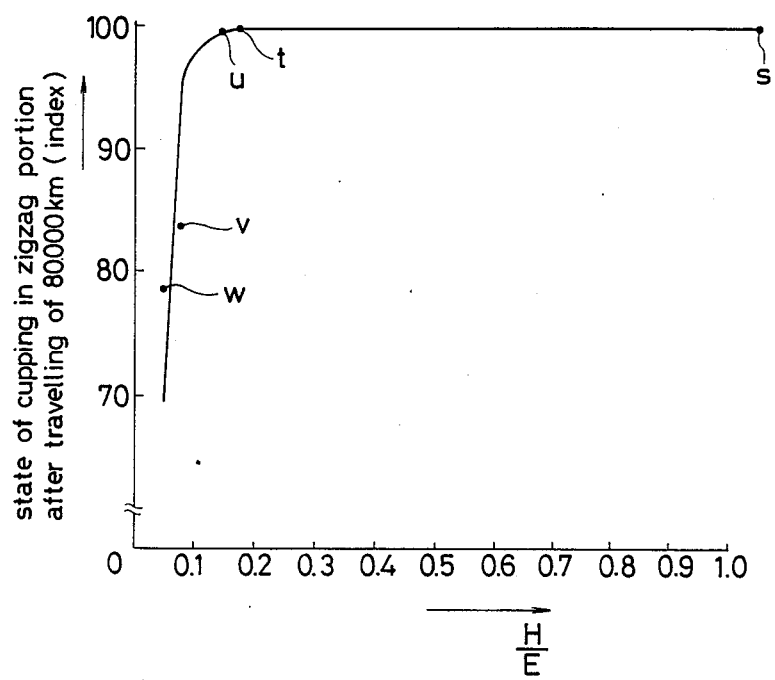
FIG. 8 is a graph showing the relationship between the ratio of the length of the pitch of the zigzag, H, to the length of the zigzag in the widthwise direction of the tire, E, (i.e., H/E) and the state of cupping in the zigzag portion.

As can be seen from the experimental data shown in Table 3, the length, E, of the zigzag in the widthwise direction of the tire and the length, H, of the zigzag affects the extent of the cupping. Specifically, as can be seen from FIG. 8 which is a graph prepared based on the experimental data shown in Table 3, test tires 9, 10, and 11 having an H/E ratio of 0.1 to 1.0 cause no problem of the cupping, while test tires 12 and 13 having an H/E ratio of less than 0.1 causes the cupping. FIG. 8 is a graph showing the relationship between the ratio of the length, H, of the pitch of the zigzag to the length, E, of the zigzag in the widthwise direction of the tire (i.e., H/E) and the state of the cupping (in terms of an index) in the zigzag portion after travelling of 80,000 km. In FIG. 8, the smaller the index, the worse the state of the cupping.

Based on the above facts, the ratio (H/E) was set at $0.10 \leq (H/E) \leq 1.0$.

(6) It is preferred that the height, G, of the zigzag disposed in the end portion of the step surface of each step be the same as the height of the corresponding step.

The height, G, of the zigzag is substantially the same as the height of the corresponding step since the step wear of the step portion should be prevented by lowering the rigidity in the circumferential direction of the tire until the wear reaches the subsequent step surface. That is, G is equal to $B_2$ (the second step portion) and $B_3$ (the third step portion). However, the final step portion has such a height as will not locate in the cross-sectional direction of the tire below an imaginary extension drawn from the end portion of the outermost belt layer in the cross-sectional direction of the tire in the belt layer capable of functioning substantially as a tension member towards the outer side in the cross-sectional direction of the tire so as to be in parallel with the radius of the tread.

(7) It is preferred that the slope, $\theta$, of the side of the step (the angle of the wall of each step in the end portion of the tread) be $0° \leq \theta \leq 20°$ in the outward direction in the cross-section of the tire (i.e. in the widthwise direction of the tire) relative to a reference line parallel to the mid-circumferential plane of the tire.

In order to relax the stress caused at the intersection with the step surface, the wall angle, $\theta$, of the shoulder portion was set at 0° or more in the outward direction in the cross-section of the tire relative to a reference line parallel to the mid-circumferential plane of the tire, and the upper limit of the wall angle was set at 20° in the outward direction in the cross-section of the tire.

(8) It is preferred that the overall height, B, of the step in the end portion of the tread (i.e., the depth of the final step surface) has the following relation with the depth, D, of the main groove 2: $D - 1.6$ mm $\leq B \leq D + 3.0$ mm.

With respect to the overall height, B, of the step in the end portion of the tread, it is generally required that the residual groove have a depth of 1.6 mm or more in order to exhibit a function as a tire. Therefore, the lower limit of the overall height, B, is set at a value obtained by subtracting 1.6 mm from the depth, D, of the main groove 2, i.e., $D - 1.6$ mm $\leq B$. On the other hand, the setting of the upper limit of the overall height with respect to the prevention of the step wear is not required because the effect of preventing the step wear can be attained as far as the relationship, $D - 1.6$ mm $\leq B$, holds. However, the tire of the present invention is sometimes used as a casing for a retreaded tire after completion of primary travelling. In the buffing which is one of the steps of manufacturing a retreaded tire, i.e., in a step of scraping off the worn portion of the tread, also the uppermost portion of the overall height in the end portion of the tread should be scraped off. For this reason, the upper limit of the overall height, B, of the step in the end portion of the tread was set at $B \leq D + 3.0$ mm.

In order to confirm the effect of the present invention, the following tests were conducted by making use of six kinds of tires as shown in Table 3. Specifically, the extent of the step wear of tires 9 to 13 according to the present invention was evaluated in comparison with the extent of the step wear of a conventional tire (comparative tire) by a road test under the following conditions: a tire size of 10.00 R20; and a pneumatic pressure of 7.25 kg/cm$^2$.

In order to evaluate the extent of the step wear, the tire was divided into 16 equal parts in the circumferential direction of the tire, and the maximum and minimum values per division with respect to the length of the step wear in the cross-sectional direction of the tire and the depth of the step wear were measured.

The results are shown in Table 3. As can be seen from Table 3, test tire 10 which is an example of the present invention exhibited a remarkable reduction in the length of the step wear in the cross-sectional direction and the depth of the step wear and was free from the occurrence of cracking and cupping at the zigzag portion. Further, test tire 10 had an improved wear resistance.

As is apparent from the foregoing description, in the present invention, the end portion of the tread was formed stepwise and, at the same time, the end portion of the step portion was formed into a zigzag shape, thereby suitably lowering the rigidity of the step portion in the circumferential direction, which not only enabled the prevention of the step wear caused at the end portion of the shoulder ribs which occurred in the conventional pneumatic radial tires without sacrificing the driving stability but also improved the wear resistance of the tire. The tire of the present invention is useful as a pneumatic tire which is applied particularly to the high-speed travelling on an even road, especially as a heavy-duty pneumatic radial tire used for this kind of application by mounting on trucks and buses.

I claim:

1. A pneumatic radial tire of the type including a carcass ply, a tread, a shoulder portion formed at each axially spaced side outside a ground-contacting axial end portion of said tread and extending circumferentially around said tire and at least two belt layers capable of functioning as a pair of tension members between said carcass ply and said tread, wherein the improvement comprises:

each of said shoulder portions including at least two steps between said tread and a sidewall of the tire and a plurality of notched angular recesses in an axially outer end portion of each step and extending circumferentially around the tire with the apex of each notched angular recess pointing toward said tread and the sides of each recess each respectively intersecting with the side of an adjacent recess;

the axial width of the radially outer one of said two belt layers is 0.95 to 1.05 times the axial width of the tread when the tire is new;

said tread includes at least one main groove having a depth D and the height, $B_1$, of the side of a first step of said steps which abuts said tread is 35 to 65% of the depth, D, of the main groove;

the axial length, F, of the surface of each of said steps which abut said tread is 0.03 to 0.06 times the width of the tread when the tire is new;

the axial depth of each recess in each step is 0.6 to 0.8 times the axial length, F, of each step surface;

the width, H, of each said recess in each step measured in a circumferential direction of the tire is 0.10 to 1.0 times the axial length, E, of said recess;

the height, G, of said recesses disposed in the axially outer end portion of a step surface abutting said tread is coextensive with the height of the axially outer step;

the side of each of said steps is sloped outwardly at an angle between 0° and 20° relative to a line parallel to the midcircumferential plane of the tire; and the overall height, B, of said two steps in each of said shoulder portions has the following relationship with the depth, D, of said main groove:

$$D - 1.6 \text{ mm} \leqq B \leqq D + 3.0 \text{ mm}.$$

* * * * *